United States Patent
Day

(10) Patent No.: US 8,978,136 B2
(45) Date of Patent: Mar. 10, 2015

(54) SYSTEMS AND METHODS FOR DETECTION AND SUPPRESSION OF ABNORMAL CONDITIONS WITHIN A NETWORKED ENVIRONMENT

(75) Inventor: Christopher Wayne Day, Miami Beach, FL (US)

(73) Assignee: Terremark Worldwide, Inc., Miami, FL (US)

(*) Notice: Subject to any disclaimer, the term of this patent is extended or adjusted under 35 U.S.C. 154(b) by 323 days.

(21) Appl. No.: 13/399,116

(22) Filed: Feb. 17, 2012

(65) Prior Publication Data

US 2014/0245439 A1    Aug. 28, 2014

Related U.S. Application Data

(60) Provisional application No. 61/443,831, filed on Feb. 17, 2011.

(51) Int. Cl.
*H04L 29/06* (2006.01)

(52) U.S. Cl.
USPC ......... 726/23; 726/3; 726/13; 726/22; 726/25

(58) Field of Classification Search
CPC ...................................... H04L 29/06
USPC ............... 726/10, 22, 23; 709/217, 218, 219; 713/168, 169, 170
See application file for complete search history.

(56) References Cited

U.S. PATENT DOCUMENTS

| 8,407,785 | B2* | 3/2013 | Sidiroglou et al. | 726/22 |
| 2006/0190996 | A1* | 8/2006 | Korkishko et al. | 726/9 |
| 2007/0011743 | A1* | 1/2007 | Krishnamurthy | 726/23 |
| 2007/0240221 | A1* | 10/2007 | Tuvell et al. | 726/24 |
| 2010/0043066 | A1* | 2/2010 | Miliefsky | 726/9 |
| 2012/0260342 | A1* | 10/2012 | Dube et al. | 726/24 |

OTHER PUBLICATIONS http://www.eset.com/us/resources/white-papers/Heuristic_Analysis.pdf "Heuristic Analysis-Detecting Unknown Viruses"—Harley et al, ESET, May 2009.*

* cited by examiner

*Primary Examiner* — Randy Scott

(57) ABSTRACT

Systems and methods are provided for handling a malicious computer-related security event that occurs at central network access points of the Internet involving networks of autonomous and different internet service providers. A system includes a non-signature based security event detection software system operating on a first computer connected to a first network of a first internet service provider, where the non-signature based security event detection software system detects the security event by examining runtime state of the first computer. A security event management software system operates on a processor-based platform and has access to security event detection results generated by the non-signature based security event detection software system.

21 Claims, 14 Drawing Sheets

SYSTEMS AND METHODS FOR DETECTION AND SUPPRESSION OF ABNORMAL CONDITIONS WITHIN A NETWORKED ENVIRONMENT

CROSS-REFERENCE TO RELATED APPLICATIONS

This application claims priority to U.S. Provisional Patent Application No. 61/443,831, filed Feb. 17, 2011, the entirety of which is herein incorporated by reference.

TECHNICAL FIELD

This document relates generally to systems and methods for analyzing computing systems and more particularly to systems and methods for detecting and suppressing abnormal conditions (e.g., network intrusions, malware, etc.) within one or more computing systems.

BACKGROUND

The nation's critical information infrastructure faces a threat landscape of increasing menace. Adversaries are bringing to bear attack methods of greater complexity, impact, and stealth than has ever been seen. With more of the nation's work being conducted on computer systems and networks, the importance of the security of these systems and the data they contain has never been more important. Unfortunately, the models the private and public sector organizations are using today results in an inconsistent approach to securing these assets, at best, and a complete failure in the face of motivated attackers, at worst.

This is further highlighted in that not a day seemingly goes by without news discussing that yet another organization has suffered an intrusion into their information technology systems. These intrusions even occur within organizations that are compliant with so-called 'industry best-practices,' maintain defense-in depth, employ rigorous patching regimens, perform annual audits, provide user security awareness training, and so on. Each year the Office of Management and Budget issues a report to Congress on the implementation of the Federal Information Security Management Act of 2002 (FISMA). Many of these organizations, while "Certified and Accredited," still have suffered very serious attacks and loss of data from many different types of incidents.

As additional background, current approaches for addressing these problems can include: an Administration and Compliance (AC) component and a Threat Awareness, Assessment and Mitigation (TAAM) component. Administration and Compliance is the sum of all of the activities most people would identify as common information security practices within an enterprise. It consists of, for example, the designing and deploying of systems in a way so as to be hardened against attack, the deployment of intrusion detection and prevention systems, the use of anti-virus software, being FISMA, PCI-DSS or ISO 27000 compliant and so on. While this is often the entirety of most organizations' practice of information security, it is often insufficient.

Threat Awareness, Assessment and Mitigation (TAAM) is the practice of gathering intelligence on potential threats to an organization, analyzing those threats, and producing deployable and actionable mitigation strategies rapidly enough to counter the threats. This often requires a very broad and deep visibility into the threat landscape and requires highly specialized and expensive skill sets such as malware reverse engineering, network forensics, system vulnerability analysis, and system exploitation all working together to provide a proactive posture against emerging threats both internal and external to the organization. Most organizations find it difficult or impossible to justify the expense and complexity of developing a sophisticated TAAM capability but also find it difficult to outsource this function due to a fragmented market for these services. The end result is a focus on Administration and Compliance because it is manageable, measureable, and is what is required by various information security control frameworks and so-called best practices systems.

The ".gov" network consists of an estimated 2500 egress and ingress points to the Internet. This porous perimeter allows adversaries to exploit and compromise critical information infrastructure of the United States with relative ease. Currently, each Federal agency operates much like an independent enterprise and thus there is little uniformity in systems, architectures, and capabilities. Each agency controls and maintains their own security procedures and technology to prevent intrusions with predictably mixed results. Additionally, the level of complexity within IT environments has increased as a result of the rapid pace of changes enabled via emerging technologies such as virtualization and the wide variety of devices connecting to enterprise networks. These factors further complicate the requirement to maintain secure environments.

FISMA, among other things, provides a framework of best practices for civilian agencies to operate government information systems in a secure manner. FISMA, coupled with detailed controls and procedure guidance from the National Institute of Standards and Technology (NIST), is intended as a best practices security standard analogous to those found in the private sector such as the ISO 27000 series or the Payment Card Industry Data Security Standard (PCI DSS). A successful security standard may not only describe a set of controls appropriate to the perceived threat and collection of assets being defended (which FISMA does) but also measure the "effectiveness" of those controls for actually improving the information security posture (which FISMA does not). Additionally, there may be accountability either explicitly delineated in the standard or implicitly via market consequences or externally imposed penalties. In other words, FISMA and the accompanying NIST controls focus almost exclusively on AC and do not require any TAAM capability within Federal agencies. This half-solution is mirrored in the private sector as well in the ISO 27000 series and PCI-DSS standards.

Another hallmark of reactive Administration and Compliance postures is a reliance on signature-based systems such as intrusion detection/prevention systems and conventional anti-virus and malware systems. While these systems have a role in effective information system security, namely rapid, organization-wide detection once a threat has been identified by a proactive TAAM practice, to naively rely on them to detect previously unseen attacks (so called 0-Day exploits) not only leaves organizations completely blind to the attack but can also induce a false-sense of security perpetuated by blissful ignorance. This misuse of the technology leaves organizations with a brittle information security posture that collapses in the face of new and emerging attack techniques. Adversaries know this and plan their attacks accordingly.

In a threat environment that sees rapid evolution, often on the order of weeks and months, Federal procurement cycles on the order of years have little hope of fielding technology and solutions that can be relevant to the conflict.

SUMMARY

Processor-implemented systems and methods are described herein for handling malicious computer-related security events (e.g., malicious network intrusions, malware operating on a computer, etc.). For example, a security event management software system and method can be configured to have access to security event detection results from computer systems operating within the networks of different internet service providers. Security event analysis is generated based upon security detection results from a first computer system operating with a network of a first internet service provider. The security event analysis is deployed for use by computer systems in networks of other internet service providers in order to address security events.

As another example, a processor-implemented system and method can be configured for handling a malicious computer-related security event, wherein the security event occurs at central network access points of the Internet. The central network access points are points involving networks of different internet service providers.

In this example, a non-signature based security event detection software system is configured to operate on a first computer (which is connected to a first network of a first internet service provider). The non-signature based security event detection software system detects the security event by examining runtime state of the first computer.

Also in this example, a security event management software system (which can operate within a security operations center environment) is configured to operate on a processor-based platform and has access to security event detection results generated by the non-signature based security event detection software system. The security event management processing software system deploys information to systems of the other internet service providers that are associated with the central network access points. The deployed information is used by the systems associated with the other internet service providers to handle a security event in their respective networks that is similar to or same as the security event encountered in the first network.

DETAILED DESCRIPTION

The system described herein is a consolidated security and network services solution with visibility across multiple (e.g. dozens) of networks, which allows the system to offer broader insight into known and previously unseen threats and vulnerabilities. For example, United States government agencies can connect to the system's capability stack via a number of available network methods and immediately gain the benefits of a greatly enhanced information security posture. The system utilizes proven methods of intrusion suppression, mitigation and deterrence. The system also provides a holistic view of current and emerging cybersecurity threats due to its broad network visibility.

Figure 1:
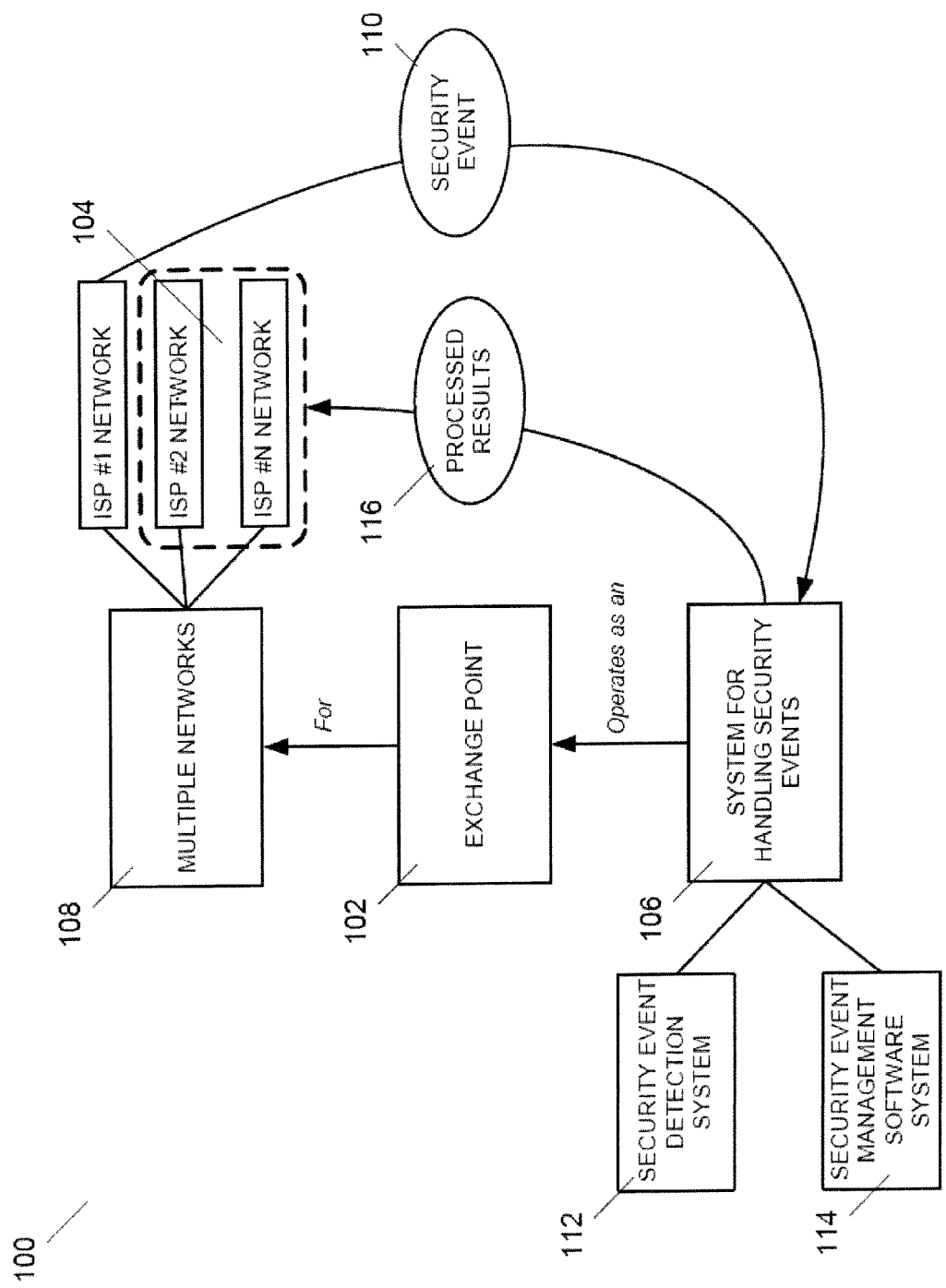
FIG. 1 depicts a system operating as an exchange point.

FIG. 1 depicts a system operating as an exchange point. An Internet exchange point 102 is a physical infrastructure through which Internet service providers (ISPs) 104 exchange Internet traffic between their networks, which are autonomous. Because of this, the different ISPs 104 do not exchange security event (e.g., intrusion detection) information. In contrast, from the vantage point of the exchange point 102, a system for handling security events 106 can monitor all of the traffic coming in and out of the exchange point 102, which involves traffic from disparate networks 108 of different ISPs 104. The system 106 can trace back in time once a security event 110 (e.g., a compromise) is detected for an ISP to determine what the security event 110 looked like and extract/formulate signatures from it. The system 106 can further use this information for rapid detection of similar security events in the networks and computer systems of other ISPs.

Because the system 106 operates at an exchange point 102, the system 106 can see across multiple networks 108 in order to more holistically handle security events. Accordingly, adversaries can be detected and denied across multiple networks in a quick and efficient manner.

As shown in FIG. 1, the system can include a security event detection system 112 which can be implemented directly within the computer systems of an ISP. The security event detection system 112 can be configured to include a non-signature based approach for detecting security events, such as by examining runtime states of computers within an ISP's network and comparing them to what runtime states are expected. Such an approach is therefore not premised on knowing what the malicious activity resembles in order to detect the malicious activity. Rather, the system recognizes what the normal states are and can detect significant deviations from them.

Using a non-signature approach, a signature-based approach, or a combination of both, the security detection system 112 can detect when a security event has occurred and provide detection results to a security event management software system 114. The security event management software system 114 can further process the detection results, such as by making the information anonymous, correlating it with other results (e.g., from other ISPs), and formulating virus signatures. The processed results 116 can then be deployed to other ISPs so that they can address the same or similar type of attack.

The operational systems and architecture of the system are designed to be highly scalable while utilizing proven and innovative technologies. The system can be configured in many ways, such as to include managed security services platforms (MSSPs) which are distributed at a multi-carrier network provider's secure and resilient facilities, enable customer connectivity, and house analytics and threat prevention systems within the security layer. The system can also be configured to include managed security operations centers, which are staffed in multiple, secure locations by a set of highly trained and certified engineers and analysts who analyze threats and vulnerabilities, as well as monitor and manage the platform systems.

One difficulty in dealing with the new breed of sophisticated information security threats is one of scale, both in the required sophistication of, and the time to deploy, countermeasures against an identified threat. The disclosed system offers features to support a sophisticated array of threat assessment gathering, threat prevention, and threat remediation services. The system provides the capability to reduce the impact of threats, vulnerabilities, and the consequences of compromised systems.

Utilizing the large-scale aggregation of connectivity into resilient, regional Managed Security Service Platforms (MSSP) and interconnected Managed Security Operations Centers (MSOCs), deploying new countermeasures to emerging threats can be done very rapidly, across large numbers of target networks. Given the ability to support a variety of network and carrier-neutral connectivity and access methods, organizations may connect to and realize the security benefits of the system without having to make large changes to the organization's networking environment. In the system, the organization can initiate a connection into one or more of the MSSP sites via a variety of methods, utilizing the access method best suited to them.

Figure 2:
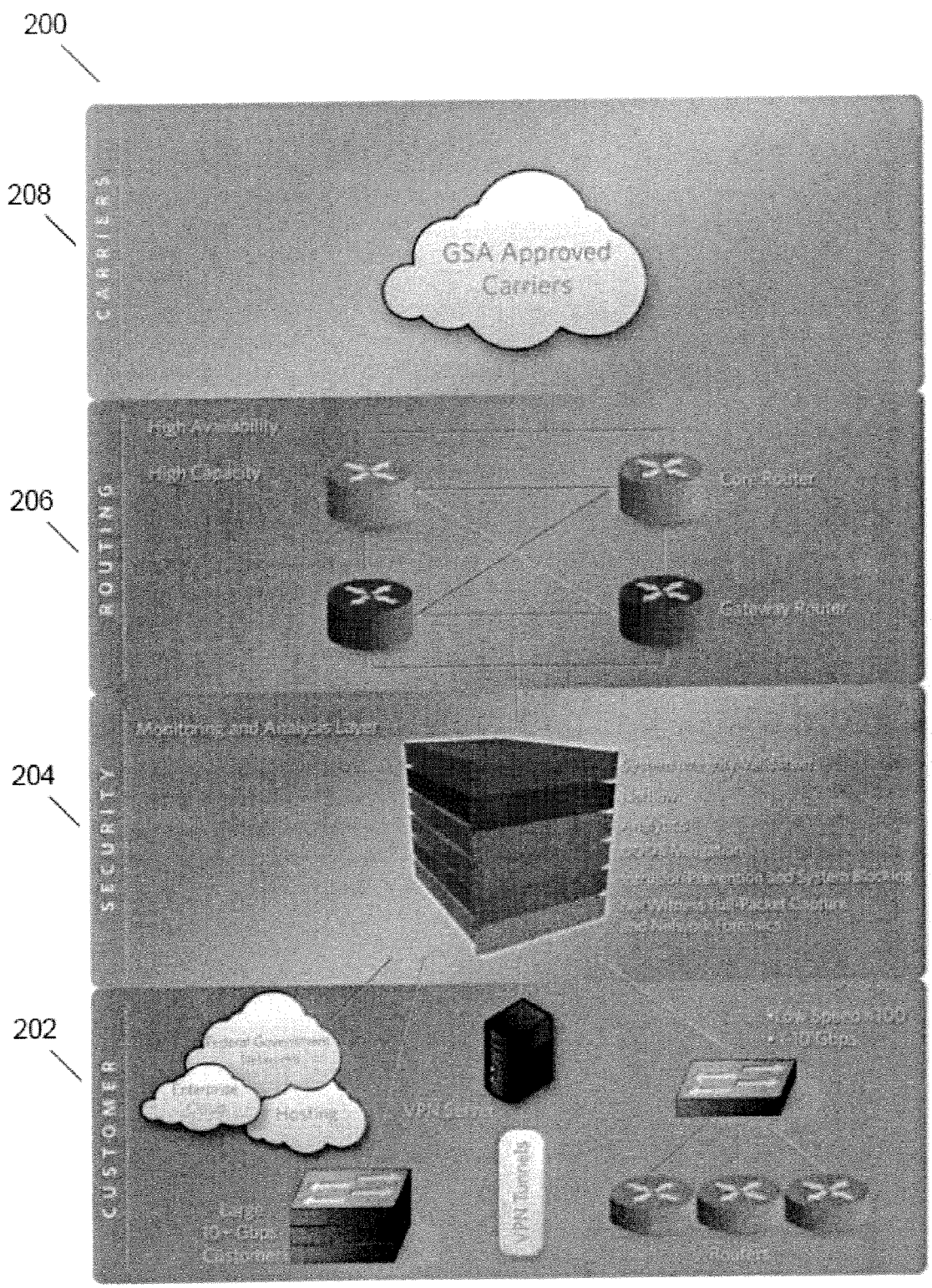
FIG. 2 depicts a 4-layer architecture model of a Managed Security Service Platform system architecture.

FIG. 2 depicts a 4-layer architecture model of a Managed Security Service Platform system architecture. The model includes a Customer Access layer 202, a Security Layer 204, a Routing Layer 206, and a Carriers Layer 208. The Carriers, Routing, and Security layers 208, 206, 204 contain the systems and elements of the MSSP that may be collocated and managed exclusively within a multi-carrier network provider location as well as that portion of the "Customer" layer that terminates within the multi-carrier network provider location.

Figure 3:
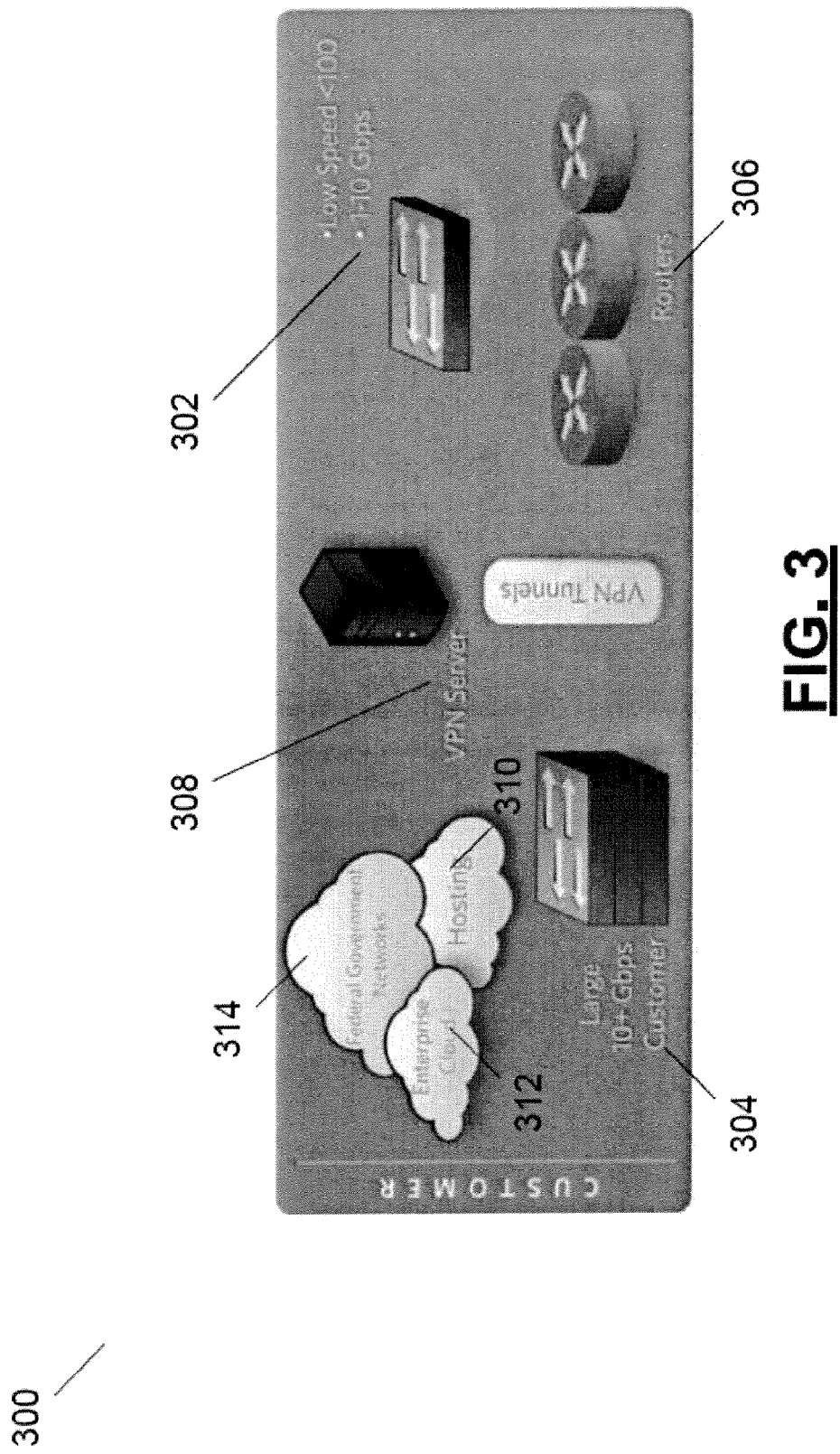
FIG. 3 depicts a Customer Access layer of a Managed Security Service Platform.

FIG. 3 depicts a Customer Access layer of a Managed Security Service Platform. The Customer Access layer gives customers flexibility in accessing the system's capability stack. One significant advantage to the MSSP model is that customers can very quickly and easily utilize the system with minimal agency network architecture changes. The Customer Access layer enables a number of flexible access options that allow customers to redirect network traffic without adding significant costs, while at the same time preserving existing system investments. The presence of carrier-neutral exchange points in the MSSP system allows for lower latency for customer access as well as greater chances for attribution in the event of a multi-carrier, multi-hop network attack.

The Customer Access layer enables a number of different access options. For example, for Medium and High Speed Customers 302 (e.g., between 1 Mbps and 1 Gbps bandwidth), the customer may be provided a dedicated link into one or more MSSP sites. For Very High Speed Customers 304 (e.g. 10 Gbps or more bandwidth), the access method may be similar to Medium and High Speed Customers but may require a larger capacity router 306 at a MSSP site. Virtual Private Network (VPN) 308 customers can leverage their current Internet connection and possibly their current VPN solution. VPN customers may set up site-to-site VPN concentrators at any one or multiple MSSP sites. All Internet-bound traffic would be forced through the MSSP site. Hosted customers 310 are customers who have moved their infrastructure to a platform of a trusted multi-carrier network provider in any of the MSSP sites. This allows an end customer to offload risk and responsibility to trusted experts using the latest technology and best practices. Enterprise Cloud 312 customers are customers who are running their applications and infrastructure on a multi-carrier network provider's cloud-computing technology platform, with the associated serviceable Enterprise Agreements and security measures. Collocation Customers may purchase space in a MSSP site and deploy their own equipment. Access to the Internet is via a simple, high-speed cross-connect into the MSSP architecture. Existing federal government backbone networks 314 may be hosted by the multi-carrier network provider. These customers can be immediately routed through the MSSP architecture with a simple, high-speed cross-connect.

Figure 4:
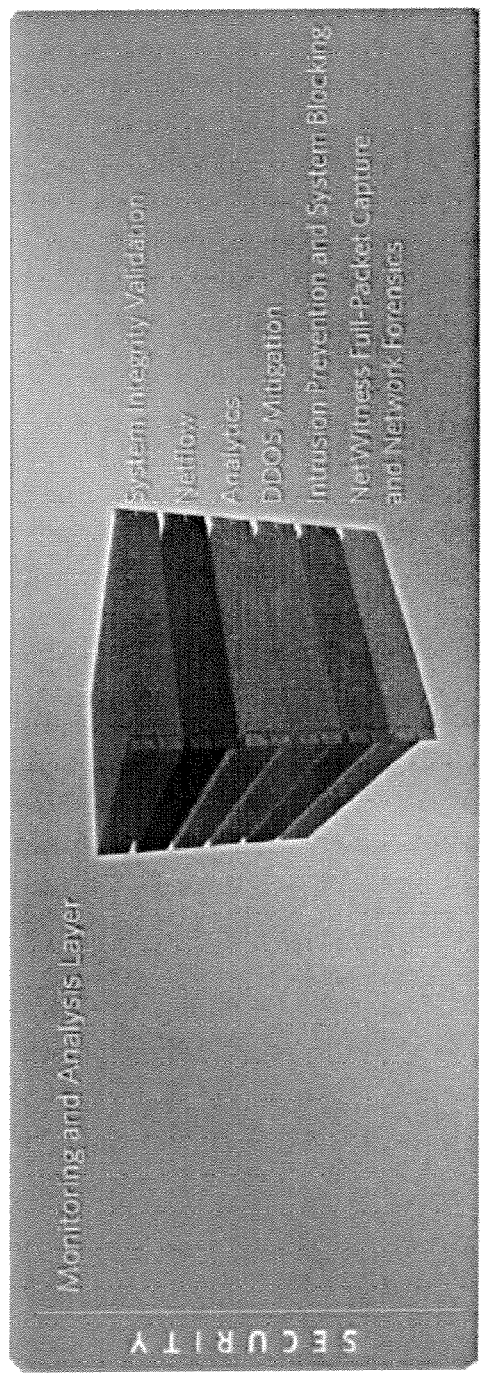
FIG. 4 depicts a Security layer of a Managed Security Service Platform.

FIG. 4 depicts a Security layer of a Managed Security Service Platform. The depicted security architecture includes a modular technology platform that allows for constant testing and updating with the latest technology. This drastically reduces the time to identify and counter threats. Also, by being located in highly secure and resilient physical facilities, integrated into some of the most densely connected multi-carrier environments in the world, and utilizing out-of-band monitoring and mitigation pathways, the system can be highly resistant to attack. Additionally, the security layer may be backed by a cloud-computing platform that allows for nearly instantaneous and elastic matching of computing resources to access. This capability provides for surge capacity and the ability to easily and cost-effectively scale for growth while also defending against session-exhaustion-based attacks against the infrastructure.

Multi-carrier network providers may design security systems, operations, and incident response capabilities with intrusion suppression in mind. The central tenet of intrusion suppression is that although information systems are hardened against attack and adhere to best practices for information security, administration, and compliance, these systems will nevertheless be vulnerable to a sufficiently motivated and skilled attacker and can be compromised. Intrusion suppression relies on the capability to know when a system has been compromised and to react to that compromise quickly enough to reduce or eliminate the damage caused. Thus, attacks can be mitigated, and the adversary's high-value, 0-day exploit may now be exposed. Knowledge of the high-value exploit can be employed in signature-based systems for rapid, automated detection and prevention going forward.

In addition to the traditional information security technologies such as signature-based intrusion detection and prevention systems, the system also leverages advanced and innovative technologies such as System Integrity Validation, Network Behavior Analysis, Network Forensics, and Network Attack Replay to be able to detect when the results of a successful attack such as malicious program or 0-day exploit begins to communicate or send data to the adversary.

As noted above, System Integrity Validation technology may be employed by the system disclosed herein. Conventional information security solutions and incident response techniques are unable to deal with the threats posed by today's sophisticated adversaries. With increasing frequency, targeted attacks leverage unknown vulnerabilities to infiltrate an enterprise. Once inside, the attacks employ sophisticated stealth technology and covert updates to remain hidden from traditional anti-virus and network intrusion detection systems. Exploiting the lack of visibility into the runtime state of the organization's critical systems often facilitates this subterfuge. System memory analysis is the means necessary to access this runtime state and reveal unknown components of the information infrastructure. The digital artifacts extracted from system memory provide valuable information about the runtime integrity of the system; they provide the ability to link artifacts from disparate data stores, and the ability to ascertain investigative leads that may have been lost using traditional response procedures. By combining memory analysis with more traditional forensics analysis (network, file system, registry), the state of the system and the digital environment in which the incident occurred may now be rapidly reconstructed.

A multi-carrier network provider may provide a platform that combines cross-platform memory analysis capabilities with remote real-time access to a system's physical memory and file system. The platform may provide security analysts and investigators with the ability to continuously automatically monitor and verify the runtime state (integrity) of the systems within the organization. If a compromise is detected, the platform may be able to automatically capture a sample of physical memory while the artifacts are still resident in memory and temporally relevant. The platform may also provide the ability to characterize how the system has been modified by the attacker and automatically search for other threats that may be hiding within the enterprise. To achieve realistic, effective information security, security systems can go beyond signature and network-centric approaches.

Figure 5A:
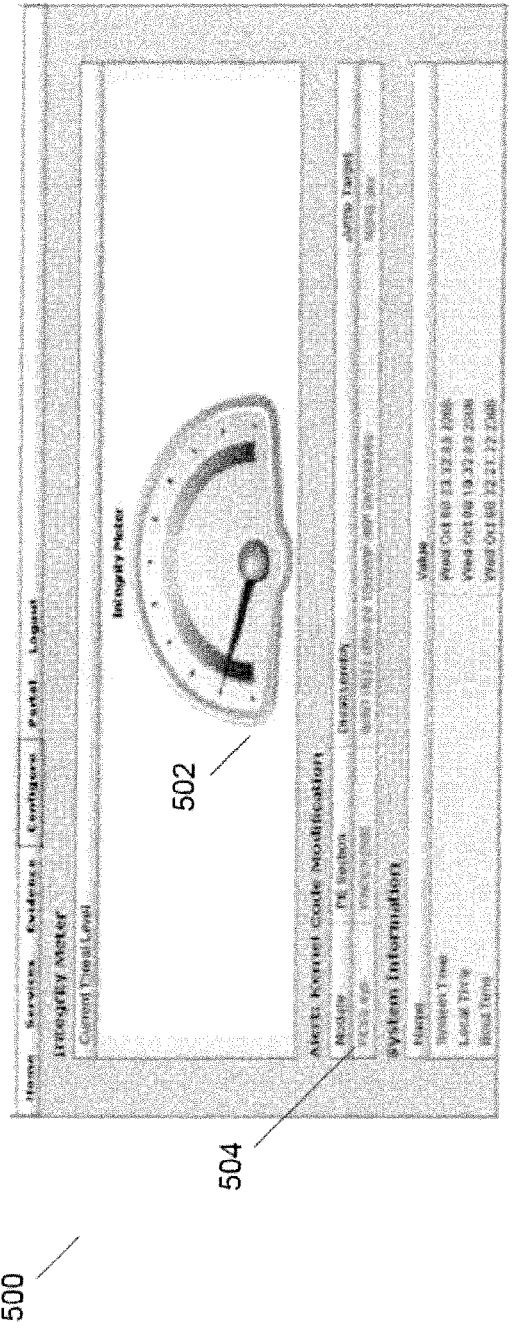
FIGS. 5A and 5B are screenshots of example software for monitoring a platform that combines cross-platform memory analysis with remote real time access to a system's physical memory and file system.
Figure 5B:
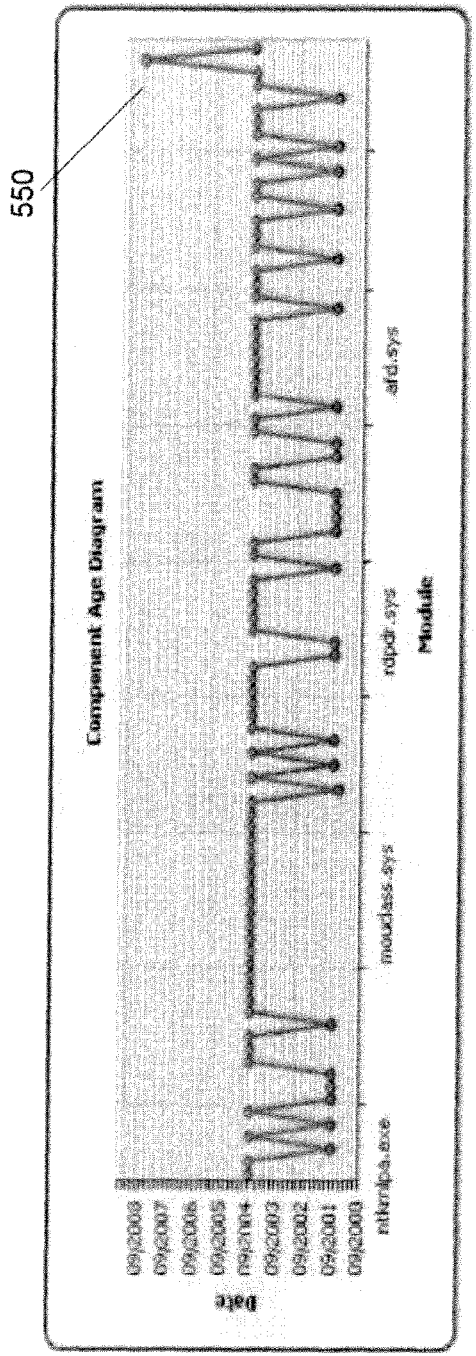

FIGS. 5A and 5B are screenshots of example software for monitoring a platform that combines cross-platform memory analysis with remote real time access to a system's physical memory and file system. In FIG. 5A, an integrity meter 502 indicates a likely-compromised system, where the needle at the left edge indicates a strong likelihood of compromise, with an alert 504 providing details of the suspected compromise. The screenshot of FIG. 5B similarly indicates a likely-compromised system, where a component 550 has been modified recently compared to other components.

Figure 6:
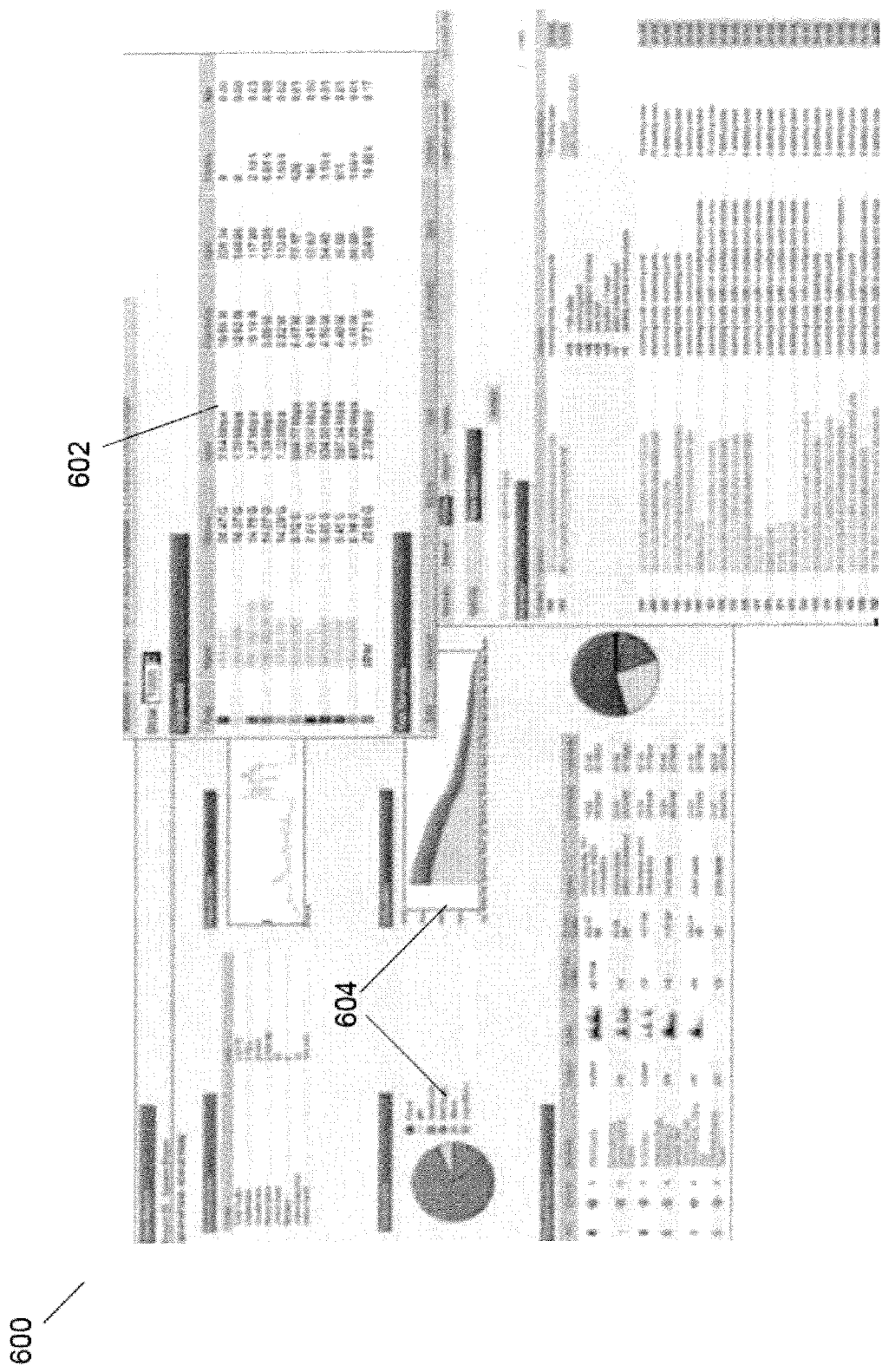
FIG. 6 depicts a network flow-based analysis interface.

FIG. 6 depicts a network flow-based analysis interface. The interface includes information about connections made with the network 602 and various metrics 604 about each connection. The network flow-based analysis interface may utilize real-time network behavior analysis technology to provide this information. The network flow-based analysis interface can be a powerful tool in detecting malicious activity and providing stealthy command and control systems for various forms of malware.

To facilitate the analysis of network-based attacks, uncovering command and control channels for malware and detailing data mining of network traffic to assess new threats, the system may utilize a number of network forensics tools. These tools may be a part of a proper intrusion mitigation strategy because they allow the reconstruction of a 0-day attack once detected and accelerate the construction of signatures for wide-scale deployment. Network forensics also support more effective correlation of signature-based alerts and help reduce false positives.

Figure 7:
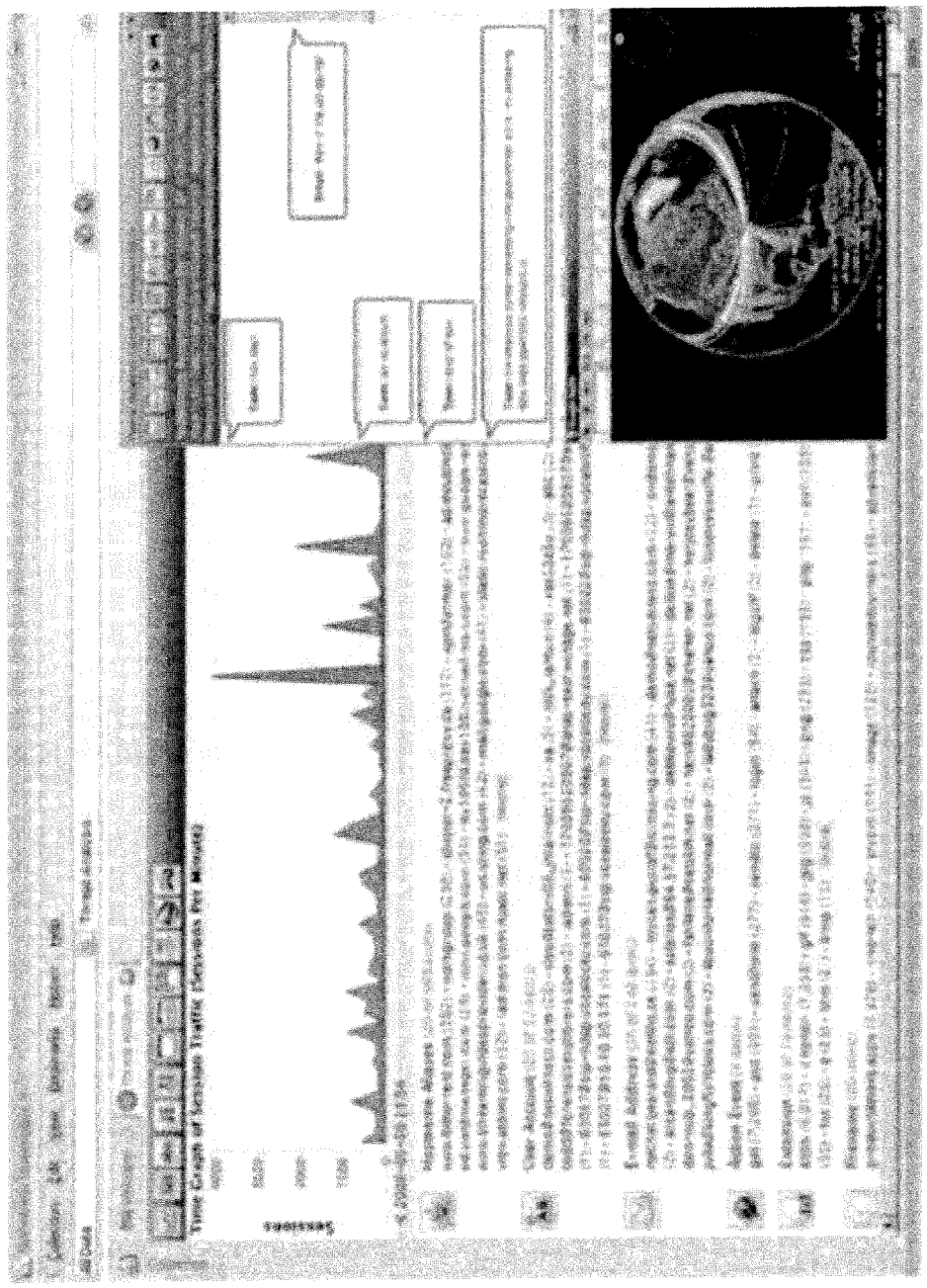
FIG. 7 depicts an interface for a network forensics platform.

FIG. 7 depicts an interface for a network forensics platform. The network forensics platform of FIG. 7 is scalable and provides distributed full capture modeling and real-time analysis, with historic network data retention (e.g., days, months, years). Such a network forensics platform may be used by a multi-carrier network provider to help solve a variety of information security problems including: advanced persistent threat management; sensitive data discovery and advanced data leakage detection; malware activity discovery; insider threat management; policy and controls verification and e-discovery.

Figure 8:
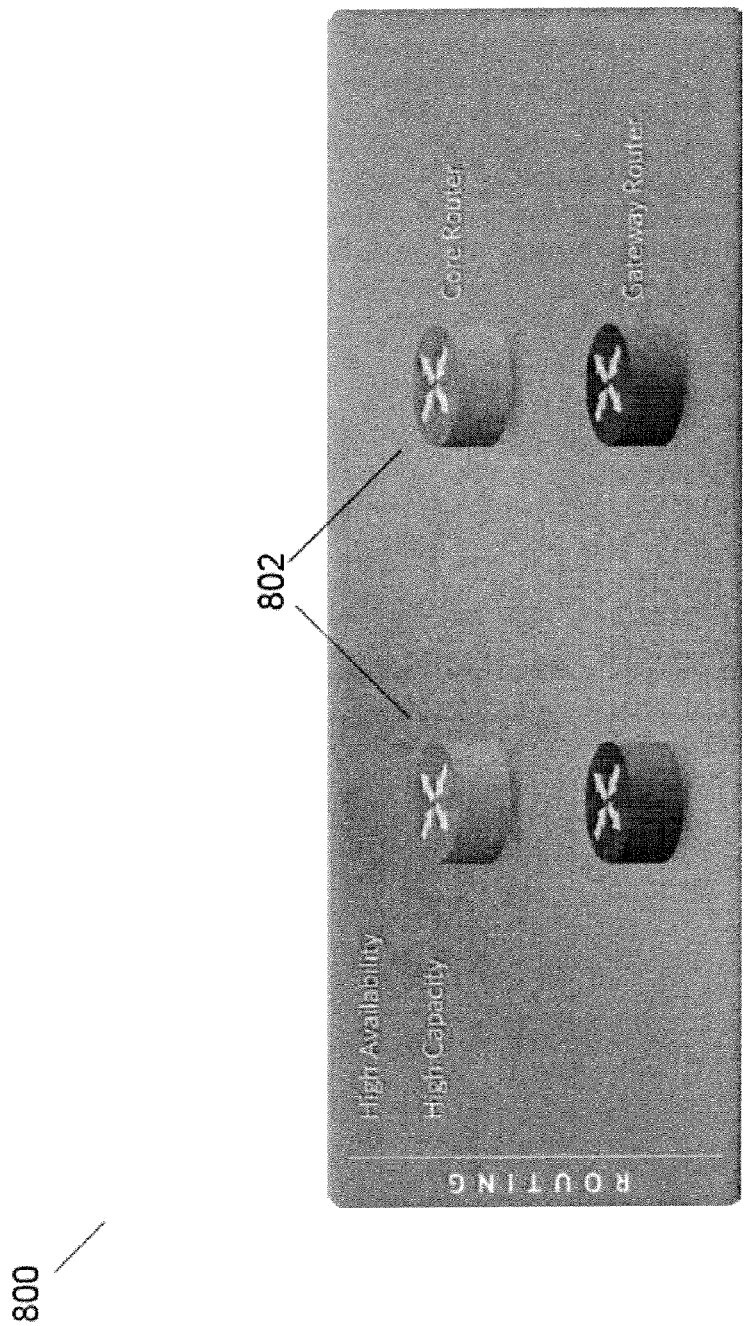
FIG. 8 depicts a Routing Layer of a Managed Security Service Platform.

FIG. 8 depicts a Routing Layer of a Managed Security Service Platform. The Routing Layer is implemented at exchange points. The Routing Layer may provide a resilient, reliable, and high-capacity platform for interfacing with the Carrier Layer. At the core of this platform may be a set of carrier grade routers and switches 802 capable of transferring at least 40 million packets per second, at core switching speeds ranging from 5 Gbps up to 160 Gbps. The core routers are connected in a fully redundant mesh configuration to a Peering Network where access to the carriers and worldwide connectivity is provided via multiple 10 Gig-E connections. A Peering Network allows Internet-bound traffic to pass "to" a connected Autonomous System Number (ASN) and its customers to reach its destination Reliability is further enhanced via interconnections between the two routers via 10 Gig-E trunks.

The Routing Layer utilizes a single ASN. Having an ASN may offer several advantages. A single ASN allows a perimeter (or wall) to be defined as the basis for security. Security encompasses many layers and initial security deployed at the edge or boundary of the ASN can block well-known malicious traffic from so-called dark networks and dark IP. DDoS mitigation tactics are usually deployed at the edge as well. Advertising IP blocks from this ASN is what forces the traffic through the on-net data centers and allows the traffic to get scrubbed by the cleaning center before entering the end customer network.

Figure 9:
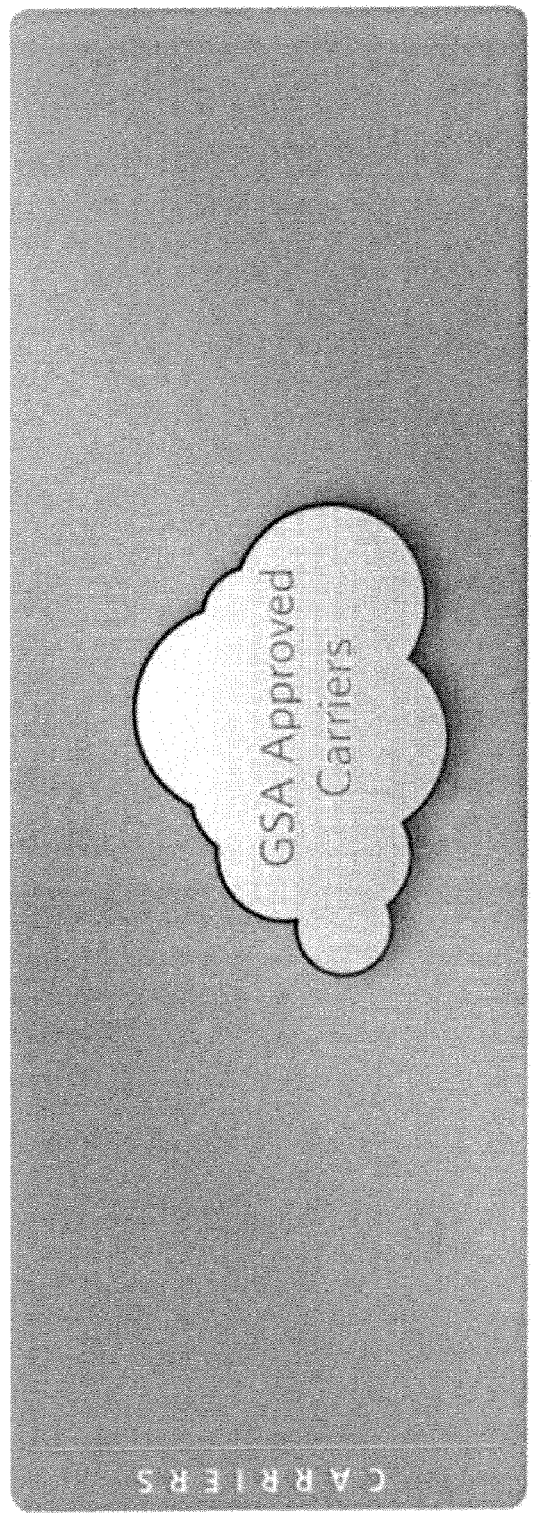
FIG. 9 depicts a Carriers Layer of a Managed Security Service Platform.

FIG. 9 depicts a Carriers Layer of a Managed Security Service Platform. The Carriers Layer may be used to provide improved network performance by condensing the worldwide reach of several GSA-approved network providers into one single connection. By connecting to Carriers Layer, a customer may receive a package of benefits, including: multiple tier one providers, continuous monitoring and reporting, BGP configuration recommendations, traffic and route reporting, performance analysis, reduced latency, optimized routing, excellent network performance, DDoS reporting and protection, and redundant configuration, which provides even greater overall Internet access reliability, improved cross-carrier security event, and attack visibility.

A Managed Security Operations Center (MSOC) concept is a design used to help mitigate many of the issues discussed previously with regards to a SOC. These issues include the SOC's limited visibility due to the scope of the network environment it monitors and the tools used by many SOCs. The MSOC concept provides a SOC capability but is far more global in perspective, both in threat assessment and tool visibility. The MSOC concept also utilizes a far higher performance delivery platform.

Figure 10:
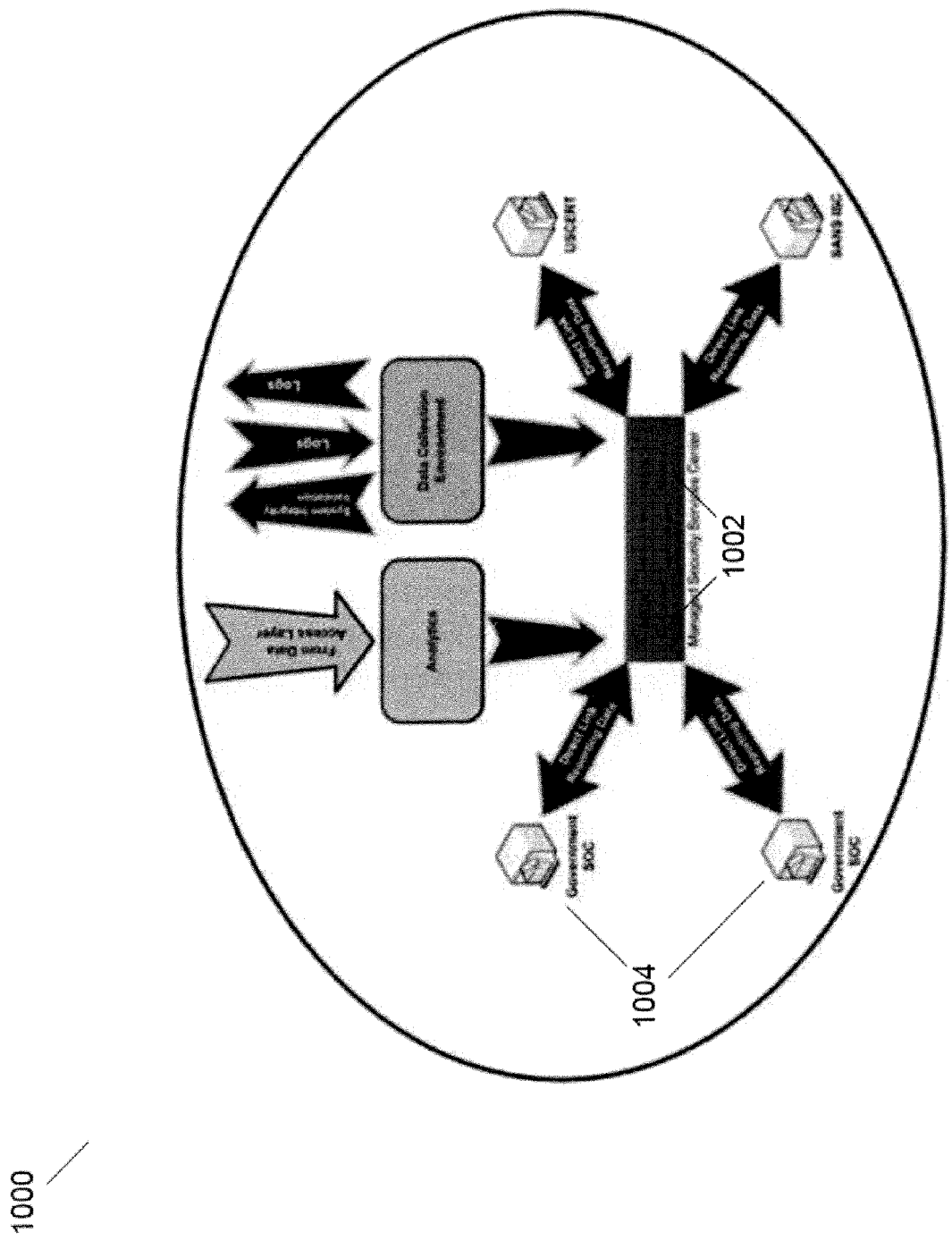
FIG. 10 is a diagram depicting analysis and threat data flow between Managed Security Service Centers and multiple government security operations centers.

FIG. 10 is a diagram depicting analysis and threat data flow between Managed Security Service Centers 1002 and multiple government security operations centers 1004. In FIG. 10, the MSSCs 1002 of the system are located at two major sites and are staffed by experts which are fully focused on finding and studying threats that affect both commercial and government customers.

There are organizations that possess an effective and mature SOC function and simply need additional visibility, threat intelligence, or overlay tool capability. The system can provide these services in a number of ways. The system can act as a clearinghouse for threat analytics and information security events from other SOCs, anonymizing the information and propagating it to other customer SOCs. Acting as a clearinghouse, the MSOC increases everyone's awareness of threat activities. As data flows through the MSSP sites, the system's analytics systems may aggregate and correlate logs and alerts from different security devices. Information can be shared with organizations such as the SANS Internet Storm Center, US-CERT, and any other public sector SOCs who wish to collaborate. Metrics, reports, and other information may be provided on which attacks are being seen by the public sector as well as those seen by the private sector.

In addition to their unique vantage point atop some of the world's largest network hubs, the MSSCs can also provide a number of advanced services to customers. Incident response services may be provided, including support responders (remote forensics and analytics data) and other responders as necessary. A number of different threat assessment services may be provided, including malware analysis, honeynet operations, adversary activity monitoring, vulnerability assessment and penetration testing, and large-scale network utilization and trending services. Advanced, stealthy malware represents one of the primary attack vectors in use today. Utilizing large scale, automated extraction and triage-analysis of binaries seen traversing the exchange point, the disclosed system represents an opportunity to identify new strains of malware before they become a major threat as well as correlate malicious activity across multiple organizations, public and private. Honeynet operations, both automated and human-operated, can be used to draw out methods of attack for analysis. Adversary activity monitoring involves monitoring "underground" sites and activity and acting as a "clearinghouse" for other sources of adversary activity. Vulnerability assessment and penetration testing may be used to find vulnerabilities before an adversary does. The MSOCs provides vulnerability assessment services (looking for known vulnerabilities primarily as a compliance mechanism) as well as penetration testing (examining high-value systems for previously unknown vulnerabilities) to customers who cannot do this for themselves or those who desire another perspective. By integrating defensive capabilities with offensive capabilities, one can inform the other. MSSCs can also be used to provide large-scale network utilization and trending services. Many important trends regarding activity on the Internet can best be seen at large exchange points.

Figure 11:
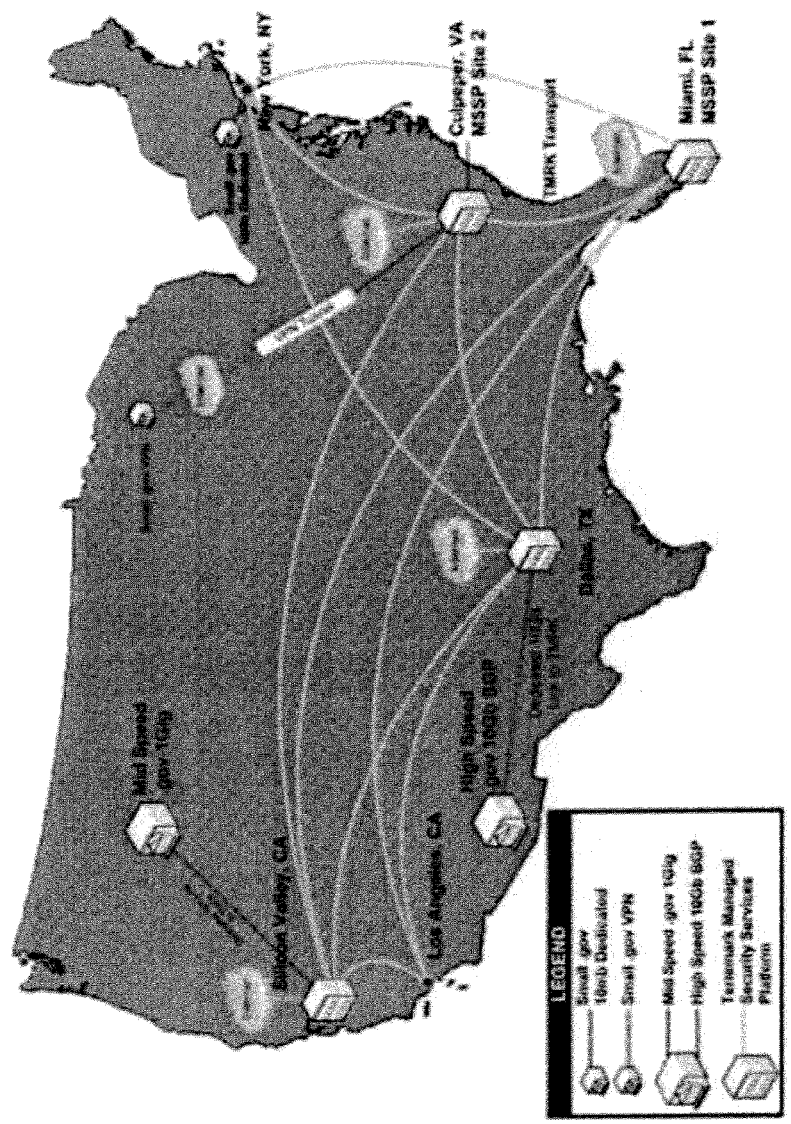
FIG. 11 depicts a map illustrating an example initial phase of a Managed Security Service platform deployment.

FIG. 11 depicts a map illustrating an example initial phase of a managed security service platform deployment. The example initial phase can leverage a multi-carrier network provider's existing state of the art infrastructure. The map details current locations in which the multi-carrier network provider can deploy the MSSP services and administrative functions in the shortest possible time.

Some of the factors considered in the initial phase deployment of FIG. 11 are as follows. Sites were sought that already had high-speed backbones deployed. The sites ensured that all of the current GSA Networx carriers can be accessed by .gov agencies. Using sites of network Points of Presence (PoPs) facilitate optimized connection, routing, and latency-reduction scenarios. Other access locations are New York City and Los Angeles. These access points may allow regional coverage and routing through the major MSSPs via the multi-carrier network provider's backbone.

FIG. 11 also illustrates MSSC locations for the example initial phase deployment in Miami and Virginia and MSSP locations in Miami, Culpeper, Dallas, and Santa Clara. The initial phase deployment may allow customers to access the Internet using a variety of connection methods, all of which will allow for security services, integrated reporting, and "clean-pipe" delivery.

Figure 12:
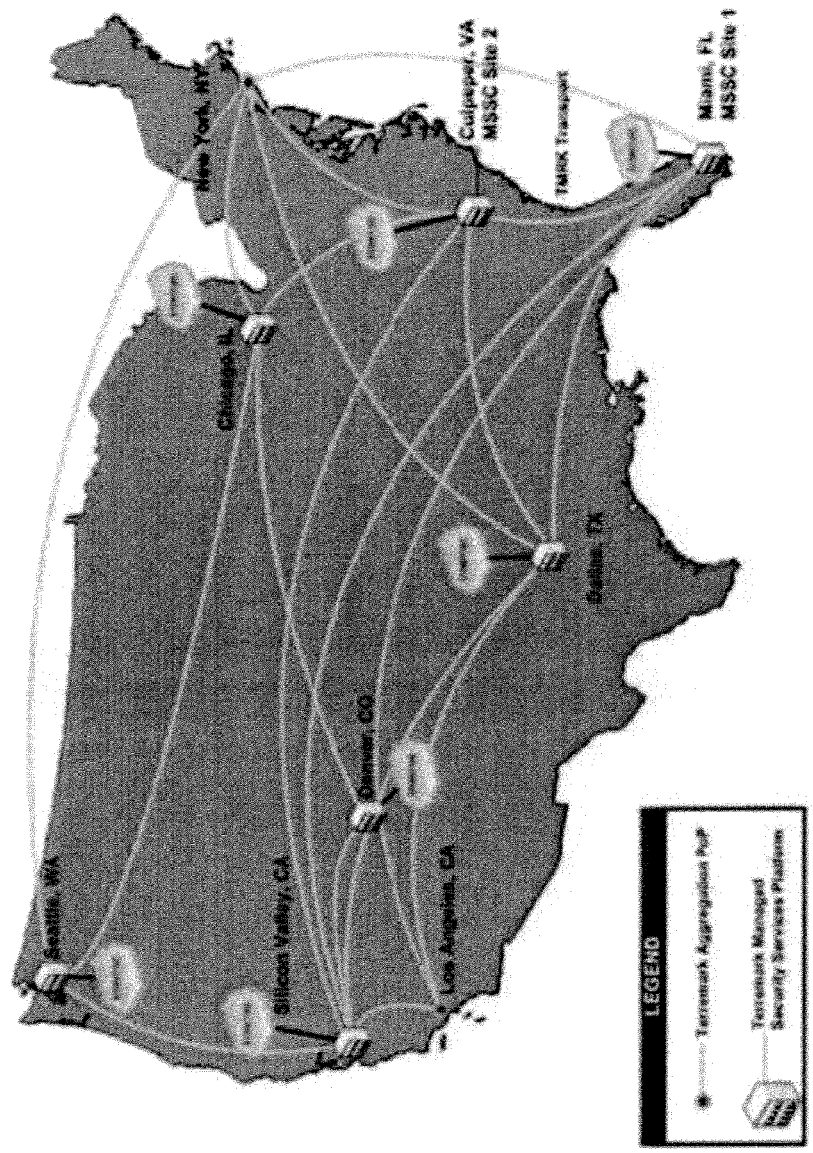
FIG. 12 depicts a map illustrating another phase of an example Managed Security Service Platform deployment.

FIG. 12 depicts a map illustrating another phase of an example managed security service platform deployment. The phase of FIG. 12 adds several regional locations throughout the country which can provide additional access and network performance for customers. In this phase, the multi-carrier network provider can deploy the MSSPs at approved locations that meet technical and security requirements. The additional access points of FIG. 12 provide cost savings to end customer organizations. Customers may experience improved performance through a reduction in latency and routing optimization.

Figure 13:
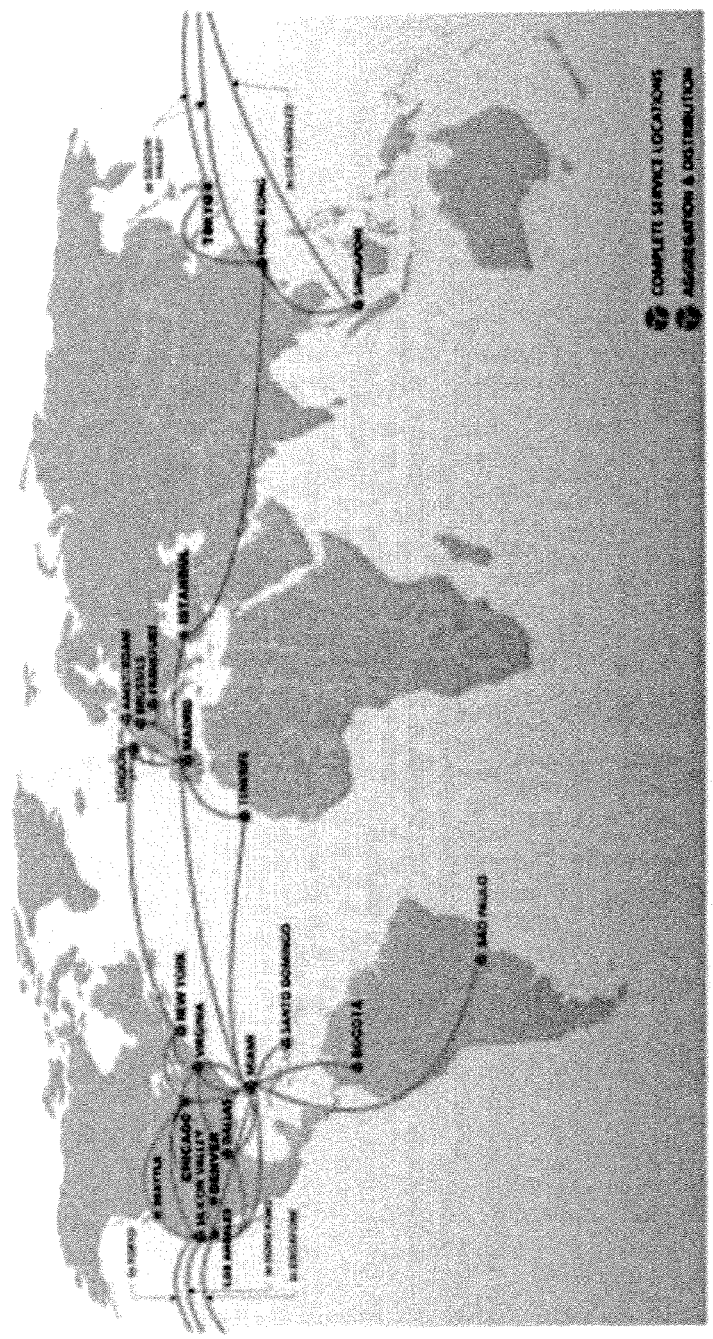
FIG. 13 depicts a map illustrating another phase of another example Managed Security Service Platform deployment.

FIG. 13 depicts a map illustrating another phase of another example managed security service platform deployment. The phase of FIG. 13 may open the multi-carrier network provider's international sites to provide trusted, tightly controlled access to the Internet for government agencies abroad. In the phase of FIG. 13, the multi-carrier network provider can leverage its international facilities to support government agency or facility connectivity abroad. Internet access can either be realized through the local facility with its own MSSP or route back through a US based MSSP. The phase reduces the security risk of doing business in a foreign country due to the trusted provider model. The phase provides a single Autonomous System Number for better security and localized "clean pipe" delivery for international organizations, agencies and facilities. The international presence of the phase of FIG. 13 may ensure optimal routing and network performance.

Figure 14:
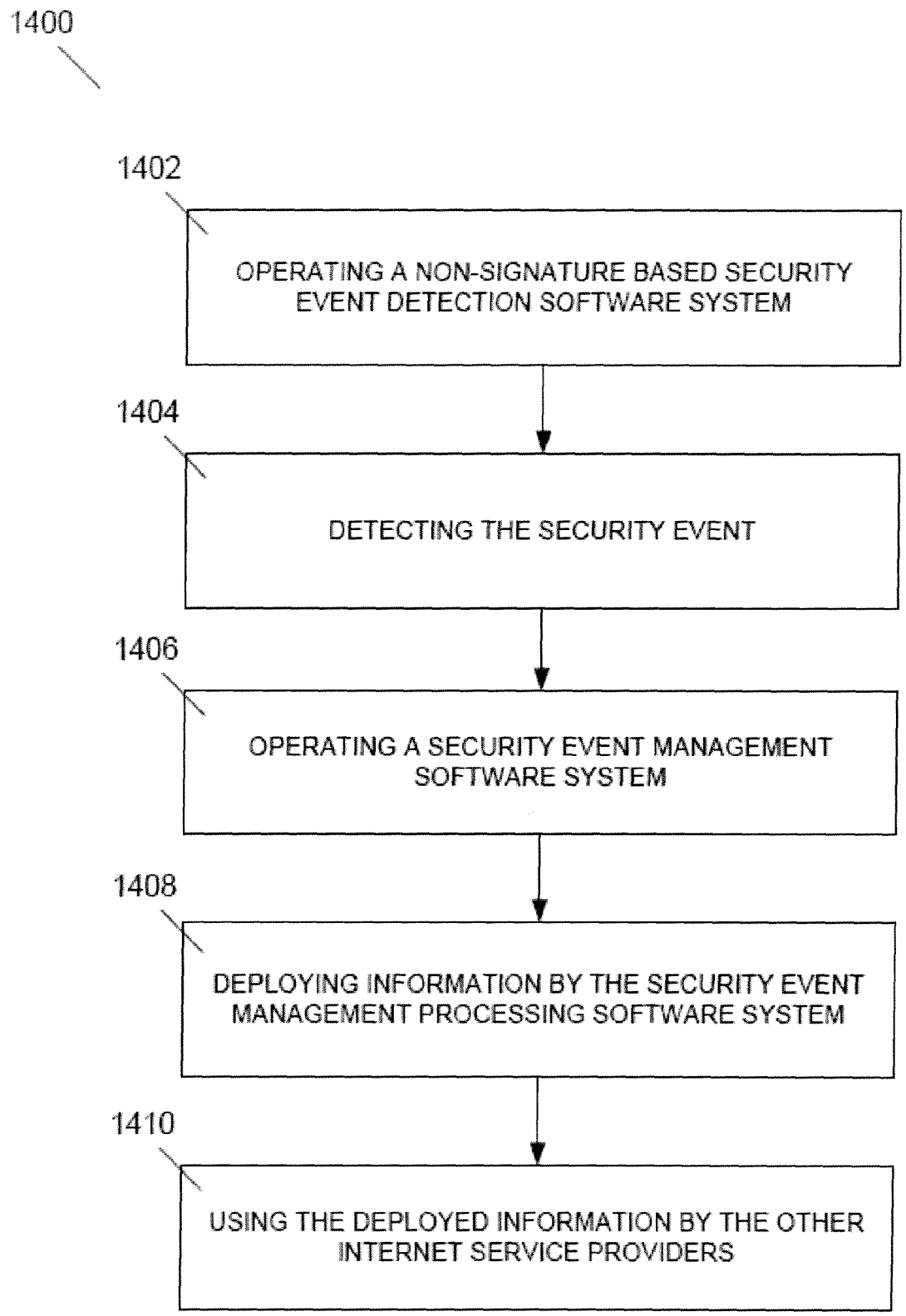
FIG. 14 is a flow-diagram illustrating a method for handling a malicious computer-related security event.

FIG. 14 is a flow-diagram illustrating a method for handling a malicious computer-related security event. At 1402, a non-signature based security event detection software system operates on a first computer connected to a first network of a first internet service provider. At 1404, the non-signature based security event detection software system detects the security event by examining runtime state of the first computer. At 1406, a security event management software system operates on a processor-based platform, wherein the security event management software system has access to security event detection results generated by the non-signature based security event detection software system. At 1408, the security event management processing software system deploys information to systems of the other internet service providers that are associated with the central network access points. At 1410, the other internet service providers use the deployed information to handle a security event within their respective networks that is similar to or same as the security event encountered in the first network.

This written description uses examples to disclose the invention, including the best mode, and also to enable a person skilled in the art to make and use the invention. The patentable scope of the invention may include other examples.

For example, a system can be configured to balance Administration and Compliance with Threat Awareness, Assessment, and Mitigation. To provide a flexible and nimble AC framework that is driven by a dynamic TAAM program, each of AC and TAAM can be managed with an eye on the other. To aid in closing the loop between the AC and TAAM functions, a system may be configured to use the threat intelligence to rapidly adjust the security posture of an organization to keep pace with the emerging threat landscape. Signatures and configurations may be developed for newly discovered threats, where those signatures and configurations are quickly deployed to ensure that systems vulnerable to a new threat are patched or isolated. A system may be configured to adhere to policy guidelines for proper usage and to continuously monitor for discrepancies to remediate, and policy requirements can be adjusted in concert with the threat landscape and the needs of the environment at hand.

As another example, a system can be configured to be proactive, in contrast to the traditional reactive model. A system's architecture can be designed to integrate a wide variety of threat intelligence data sources into information that analysts and engineers in the MSOCs can turn into actionable mitigation and defense activities. In accordance with the 'speed to action' philosophy, processes utilized by the MSOCs may be designed to facilitate rapid response while still respecting other operational equities such as system uptime and availability. Another operational aspect of the MSOCs is a separation between an event driven operations system and a threat-focused analytics system. The operation system's responsibility is to monitor various thresholds, signature-based detection technologies, system event logs, and so on for alarms and other indicators of problems. The operation system can process events utilizing a traditional ticket-based approach that is important from and Administration and Compliance standpoint and can also operate as a filtering mechanism to ensure that the analytics system can focus on its mission. The analytics system takes a different approach to analyzing the data the system's instrumentation provides. The analytics system can follow a more free form and data mining oriented approach to discover innovative and novel ways to detect malicious activity. The loop can be closed when the analytics system is able to hand over a new event source to the operational system and begins the hunt again.

As a further example, a system may not only be designed to be effective in preventing attacks, but can also be configured to be resilient when compromised. Certain attacks, such as previously unseen 0-day attacks may compromise even highly effective attack prevention schemes. In preparation for such compromises, a system can be built to offer a high degree of resilience. For example, a system may be built using highly secure systems architecture. The various layers can be based on hardened platforms that have proven themselves resistant to various forms of cyber attack such as DDoS, direct compromise attempts, and other potentially operations-interrupting events. All of the components of such a solution architecture can be housed in secure facilities that offer 100% uptime on power and environmentals. Such a systems may not only be resilient to logical attack but physical as well. Such controls, facilities, and services can also be provided to government agencies who want to house their data and infrastructure in the same tightly controlled and highly secure manner.

System deliverables may include dynamic, correlated metrics reporting on the comparison between public sector and private sector security threats, trending, system health, current vulnerability exploitation activity, BGP-based peering and network transit data, and others. Reporting can be shared with other government security centers in order to update their system on known threats/vulnerabilities. Monthly operational reports can also be provided, which will include SLA compliance reporting.

Another example includes a system that addresses a weakness in many organization's Security Operations Center's (SOC) effectiveness. For most organizations with a mature approach to information security, the information security monitoring and management function is provided out of an SOC that is typically a centralization point for monitoring data and is staffed 24/7 by appropriately trained personnel. The SOC can be an internal organization or an external third party providing the service via an outsourcing arrangement.

However, one of the primary weaknesses for many of these organizations is that their SOC's effectiveness is a function of the visibility of its instrumentation. Most SOCs only have a "local" perspective in the sense that they only monitor their own organization and the single Internet Service Provider (ISP) that provides the organization's Internet connection (for a Federal agency, via the Networx contract vehicle) and hence only see the security events that actually occur in their environment. There is no global perspective with regards to threats. Some proposed solutions and architectures that include placing enhanced security monitoring equipment within the major telecommunications carriers and Internet Service Providers (ISPs) do not address this major issue.

An effective solution attempts to leverage the incidents and threats experienced in multiple organizations into a fused situational and operational awareness. When this visibility can be extended across multiple ISPs as well as across the commercial and government environments, the solution becomes more powerful as even single-organization-targeted attacks become aware to all constituent organizations. The adversary is robbed of the benefit of reusing attack methodologies by simply varying the specifics of the targeting. This forces the adversary into an accelerated innovation cycle that substantially increases the costs of attack.

The enhanced visibility of an effective solution does not ignore host-based capabilities for an exclusively network-centric approach. A successful fusion of host-based detection and mitigation capabilities with enhanced next-generation network-based systems can deal with today's multi-spectrum threats. An example of one of these threats is the targeting of removable media such as USB drives to carry malware from system to system even across stringent security boundaries. A network-only approach misses the attack vector as well as the compromise until the malware exhibits network behavior that is detected and classified as malicious. An effective host-based system can highlight the observables of that compromise and couple that detection with network-based systems to understand the scope of the compromise.

Such a system that enables a large-scale security solution and facilitation of the administrative, third-party validation process can be housed within a high-density, carrier-neutral Internet Exchange and Peering Point. Such a system can provide customers with true freedom of connectivity, with plug-and-play access to many leading global carriers, including the GSA-approved Networx carriers. By supporting agency connectivity via the Networx carriers, agencies can maintain their current carrier relationships, preserve the current competitive environment, and allow these agencies to select the connectivity strategically best suited to their needs. By not being constrained to multiple Internet Service Provider (ISP) networks and locations, a system can avoid a fragmented solution where each ISP implements their proprietary architecture resulting in an inconsistent approach to information security that we have today, where each agency currently implements its own solution.

The system can include the ability to tightly control the ingress and egress points within the .gov network by utilizing a single Autonomous System Number (ASN). This facilitates the best possible security scenario and allows for maximum Distributed Denial of Service (DDoS) protection capabilities. The solution includes distributing a Managed Security Service Platform over multiple locations, interconnected via a fully-redundant backbone network. The Managed Security Services Platform can also be collocated at government agency-owned and controlled facilities for maximum scalability and collaboration.

The Managed Security Services Platform can be implemented to enable multiple connectivity options for .gov customers to gain access to the Managed Security Services. With the presence of all of the GSA-approved Networx contract carriers at a facility, and the flexibility of connectivity methods, government agency customers who initiate connectivity for access the Managed Security Platform can do so with minimal configuration changes to their existing networks. This adds to the privacy protection for the agencies and their constituents.

As a further example, a system can be configured to diligently safeguard privacy and civil liberties. This, however, often conflicts in perception with the need for law enforcement and the intelligence community to carry out their functions. The system can be configured, in classified and unclassified global network peering environments, as having fully defined capabilities, to minimize false perception of control and access to available data; audit features, to respond to security and audit inquiries and periodic reviews; transparent operations and governing oversight, to review and protect the data under review; and safeguarded facilities and implementations, to protect the data and systems from internal and external threats.

It is noted that as used in the description herein and throughout the claims that follow, the meaning of "a," "an," and "the" includes plural reference unless the context clearly dictates otherwise. Further, as used in the description herein and throughout the claims that follow, the meanings of "and" and "or" include both the conjunctive and disjunctive and may be used interchangeably unless the context expressly dictates otherwise.

It is claimed:

1. A processor-implemented system for handling a malicious computer-related security event, wherein the security event occurs at central network access points of the Internet, wherein the central network access points are points involving networks of autonomous and different Internet service providers, said system comprising:
   a non-signature based security event detection software system operating on a first computer connected to a first network of a first Internet service provider;
   wherein the non-signature based security event detection software system detects the security event by examining a runtime state of the first computer,
   wherein detecting the security event by examining the runtime state of the first computer comprises:
      comparing the runtime state of the first computer to a normal runtime state of the first computer, and
      determining that the runtime state of the first computer is different from the normal runtime state of the first computer;
   a second computer, on which a security event management software system operates, the security event detection software system having access to security event detection results generated by the non-signature based security event detection software system;
   wherein the security event management processing software system deploys information to systems of the other Internet service providers that are associated with the central network access points; and
   wherein the deployed information is used by the other Internet service providers to handle a security event within their respective networks that is similar to or same as the security event encountered in the first network.

2. The system of claim 1, wherein the security event comprises a malicious network intrusion security event with respect to the first network or malware operating on the first computer.

3. The system of claim 1, wherein the non-signature based security event detection software system is not premised on knowing what malicious activity resembles in order to detect the malicious activity associated with the unauthorized network intrusion.

4. The system of claim 3, wherein the non-signature based security event detection software system utilizes system memory analysis of the first computer in order to access the runtime state.

5. The system of claim 4, wherein analysis upon the system memory provides information about the runtime integrity of the first computer system.

6. The system of claim 5, wherein the security event management processing software system combines the memory analysis with more additional forensics analysis which include network analysis, file system analysis, and registry analysis.

7. The system of claim 1, wherein the non-signature based security event detection software system operates as a host-based security solution.

8. The system of claim 7, wherein security event detection results from a network-based security software system are also used by the security event management software system for handling a security event in the network of the different Internet service provides that is similar to or same as the security event in the first network.

9. The system of claim 8, wherein the network-based security software system examines incoming and outgoing network traffic.

10. The system of claim 1, wherein the security event management processing software system operates at a centralized location relative to the networks of the Internet service providers associated with the central network access points.

11. The system of claim 10, wherein the centralized location comprises a security operations center.

12. The system of claim 11, wherein the security operations center monitors multiple Internet service providers in order to detect security events that occur in the environments of the Internet service providers, thereby providing a global perspective with respect to security events across multiple Internet service providers.

13. The system of claim 11, wherein the security operations center monitors multiple Internet service providers and monitors both commercial and government networks in order to detect security events that occur in the environments of the Internet service providers, the commercial networks, and the government networks, thereby providing a global perspective with respect to security events across multiple Internet service providers and different types of networks.

14. The system of claim 11, wherein the central network access points are carrier-neutral exchange points.

15. The system of claim 14, wherein presence of carrier-neutral exchange points results in lower latency for customer access and for attribution in event of a multi-carrier, multi-hop network attack.

16. The system of claim 11, wherein the security operations center is operated by a trusted third party administrator, which allows the security operations center to have access to security event detection information across networks of different Internet service providers and to utilize the security event detection information across different Internet service providers, thereby providing visibility across multiple networks operated by different Internet service providers.

17. The system of claim 16, wherein the security operations center receives results from different types of security event detection systems that are implemented in a modular technology platform, thereby facilitating constant testing and updating with recent version of the security event detection systems.

18. The system of claim 16, wherein the security operations center operates as clearinghouse for threat analytics and information security events associated with the different Internet service providers.

19. The system of claim 18, wherein the security operations center anonymizes the security event detection information and propagates for use by other Internet service providers.

20. The system of claim 18, wherein the security operations center aggregates and correlates logs and alerts from security devices associated with different Internet service providers.

21. A processor-implemented method for handling a malicious computer-related security event, wherein the security event occurs at central network access points of the Internet, wherein the central network access points are points involving networks of autonomous and different Internet service providers, said method comprising:
- operating a non-signature based security event detection software system on a first computer connected to a first network of a first Internet service provider;
- detecting the security event by the non-signature based security event detection software system by examining a runtime state of the first computer,
- wherein detecting the security event by examining the runtime state of the first computer comprises:
  - comparing the runtime state of the first computer to a normal runtime state of the first computer, and
  - determining that the runtime state of the first computer is different from the normal runtime state of the first computer;
- operating a security event management software system on a processor-based platform, wherein the security event management software system has access to security event detection results generated by the non-signature based security event detection software system; and
- deploying information by the security event management processing software system to systems of the other Internet service providers that are associated with the central network access points;
- wherein the deployed information is used by the other Internet service providers to handle a security event within their respective networks that is similar to or same as the security event encountered in the first network.

* * * * *